United States Patent Office 3,763,210
Patented Oct. 2, 1973

3,763,210
ARLOXY AND ARYLTHIO NITRITE
COMPOSITIONS
Darrell R. Heath and Joseph G. Wirth, Schenectady,
N.Y., assignors to General Electric Company
No Drawing. Filed Jan. 20, 1971, Ser. No. 108,150
Int. Cl. C07c 121/60, 121/74
U.S. Cl. 260—465 F                    6 Claims

ABSTRACT OF THE DISCLOSURE

Aryloxy and arylthio compositions are prepared from the reaction of a nitro- or fluorobenzene containing a carboxy group or a cyano group directly attached to the benzene nucleus with an alkali-metal salt of monovalent or divalent aromatic radicals in the presence of a dipolar aprotic solvent. The invention also embraces novel difunctional compounds prepared in accordance with the above-described process.

---

This invention is concerned with a process for making aryloxy and arylthio compositions and products derived therefrom. More particularly, the invention relates to a process which comprises effecting reaction in the presence of a dipolar aprotic solvent of a mixture of ingredients comprising (1) a benzenoid compound of the general formula (I) 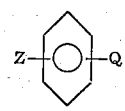

and (2) an alkali metal salt of an organic compound selected from the class consisting of (a) compounds of the general formula (II)            R—A—Alk and (b) compounds of the general formula (III)           Alk—A—R'—A—Alk where R is a monovalent aromatic radical, R' is a divalent aromatic radical, Q is selected from the class consisting of the

radical, where R" is a hydrocarbon radical of from 1 to 12 carbon atoms, A is oxygen or sulfur, Z is fluorine or the —NO$_2$ radical, Alk is an alkali metal atom, e.g., sodium, potassium, etc., and Z is ortho or para to the Q radical.

The invention is also concerned with compositions of matter selected from the class consisting of (a) compounds of the general formula (IV) 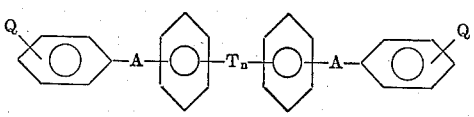

and (b) compounds of the general formula (V) 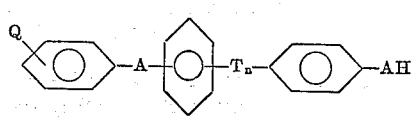

and (c) compounds of the general formula (VI) 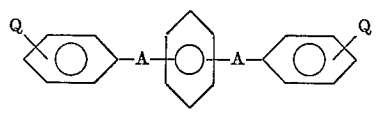

where Q and A are the same as above, T is a divalent bridging member selected from the group consisting of

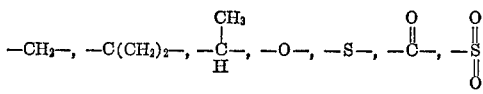

and

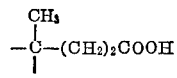

$n$ is 0 or 1, Q is ortho or para to A, and the A's in (c) attached to the same phenylene radical are meta or para to each other.

It is known that certain nitro-substituted aromatic ketone compositions can be reacted with alkali metal phenolates to form phenoxy derivatives thereof. Thus, Radlmann et al. in Die Makromolekulare Chemia, 130 (1969), pp. 45–54 disclose the preparation of polyether ketones by effecting reaction between nitro-substituted aromatic compounds containing a carbonyl group between two aryl nuclei with alkali-phenolates and alkali-bisphenolates in a dipolar aprotic solvent, such as dimethyl sulfoxide. Typical of the reactions described in this article is the reaction of 4,4'-dinitrobenzophenone with sodium phenolate,

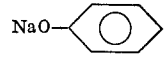

to give a diphenoxy derivative in accordance with the following equation

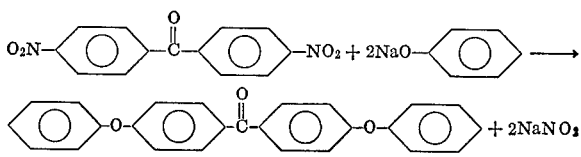

However, when an attempt is made to carry out the same reaction between the alkali metal phenolate and a nitro-aromatic compound containing a terminally situated carbonyl group, particularly nitrobenzoic acid, employing the same conditions as are used to make the diphenoxy derivatives in the above equation, it is found that the reaction does not go and there is no evidence of the formation of any product corresponding to the formula

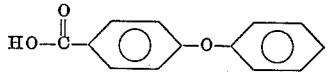

Additionally, an attempt to effect reaction between an alkalimetal phenate, specifically sodium phenoxide, and 4-nitroacetophenone likewise failed to give any product corresponding to the formula

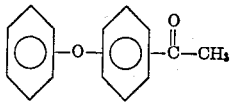

Unexpectedly, we have discovered that although the reaction between the sodium phenolate will not take place with, for instance, nitrobenzoic acid or nitroacetophenone by means of the process of the above-mentioned article, we are able to make aryloxy derivatives of benzoic acid if reaction is effected between an alkali metal phenolate, such as sodium phenolate, with benzoic acid where the benzoic acid is in the form of a nitro ester, for instance, ethyl 4-nitrobenzoate, or a fluoro ester, for instance, ethyl 4-fluorobenzoate, or in the form of the corresponding nitro or fluoro derivative of benzonitrile. This increased reaction between the alkali metal phenolate and the benzoate ester or the benzonitrile derivative results usually in almost quantitative yields of the phenoxy derivative. The benzoic acid or complex derivatives of the benzoic acid can then be obtained by hydrolysis of either the ester group or of the cyano group.

By virtue of our invention, we are able to prepare numerous monobasic and dibasic acids by reaction of a benzenoid compound of Formula I with an alkali-metal salt of an organic acid of Formula II or III. In effecting the above reaction, it is important that one use a dipolar aprotic solvent in the reaction of either the cyano or ester derivative of the benzenoid compound of Formula I.

Among the monovalent aromatic radicals (this term being intended to include organic radicals containing an aryl radical directly attached to "A") which R may represent are, for instance, monovalent aromatic hydrocarbon radicals of from 1 to 10 carbon atoms, for instance, aryl (e.g., phenyl, naphthyl, biphenyl, etc.); alkaryl (e.g., tolyl, xylyl, ethylphenyl, etc.); other organic radicals, e.g., organoxyaryl radicals, for instance, methoxyphenyl, phenoxyphenyl, ethoxyethoxyphenyl, ethoxyphenyl; pyridyl radicals, etc. Typical of the hdyroxyaryl and thio aryl compounds from which mono-alkali metal salts of Formula II may be prepared by reaction with e.g., an alkali metal, an alkali metal hydroxide or carbonate may be mentioned:

phenol
thiophenol
2,6-dimethylphenol
o-, m- and p-cresol
1- and 2-napthol
o- and p-phenylphenol
o-, m-, and p-methoxyphenol
o-, m-, and p-nitrophenol
o-, m-, and p-chlorophenol
m- and p-aminophenol
m- and p-acetamidophenol
m- and p-hydroxybenzoic acid
m- and p-hydroxybenzonitrile
3-hydroxypyridine
3-hydroxyquinoline
5-hydroxypyrimidine aliphatic and aromatic esters of m- and p-hydroxybenzoic acid, etc.

Among the divalent aromatic radicals which R' may represent are, for instance, divalent aromatic hydrocarbon radicals of from 1 to 20 carbon atoms, for instance, phenylene, biphenylene, naphthylene, etc. In addition R' may be a residue of a dihydroxy or dithio diarylene compound in which the aryl nuclei are joined by either an aliphatic group, a sulfoxide group, sulfonyl group, sulfur, carbonyl group, oxygen, the

—C(CH$_3$)(CH$_2$)$_2$(COOH)— group, etc. Typical of such diarylene compounds from which the dialkali metal salt of Formula III may be prepared by reacting the aforesaid diarylene compound with two mols of an alkali-metal hydroxide may be mentioned:

2,4'-dihyroxydiphenylmethane;
bis-(2-hydroxyphenyl)-methane;
2,2-bis-(4-hydroxyphenyl)-propane hereinafter identified as "bisphenol-A" or "BPA";
bis-(4-thiophenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hyrdoxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-propane;
2,2-bis-(4-hydroxyphenyl)-1-phenylpropane;
2,4-dihydroxybenzophenone;
4,4'-dihydroxydiphenyl sulfone;
2,4'-dihydroxydiphenyl sulfone;
5'-chloro-2,4'-dihydroxydiphenyl sulfone;
3'-chloro-4,4'-dihydroxydiphenyl sulfone;
4,4'-dihydroxytriphenyl disulfone;
4,4'-dihydroxydiphenyl ether;
4,4'-dihydroxydiphenyl sulfide;
4-hydroxy-o-biphenyl ether;
the 4,3'-, 4,2'-, 4,1'-, 2,2'-, 2,3'-, etc. dihydroxydiphenyl ethers;
bis-(4-thiophenyl)-sulfide;
4,4'-dihydroxy-2,6-dimethyldiphenyl ether;
4,4'-dihydroxy-2,5-dimethyldiphenyl ether;
4,4'-dihydroxy-3,3'-diisobutyldiphenyl ether;
2-methyl-2-carboxyethyl-bis-(4-hydroxyphenyl)-propane;
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxy-diphenyl ether;

etc., dihydric phenols substituted on the aryl nucleus with alkyl, alkenyl, cycloaliphatic, cycloalkenyl, aryl, alkaryl, numerous examples of which have been given above as well as the dihydroxy toluenes, the dihydroxy xylenes, dihydroxy pyridines, dihydroxy anthraquinones, dihydroxy benzoic acids, dihydroxy benzophenones, etc.

The R' radical can also have inert substituents on the aryl nuclei, for instance, monovalent hydrocarbon radicals such as methyl, ethyl, cycloaliphatic radicals (for instance, cyclopentyl, cyclohexyl etc.), etc.; aryl radicals, e.g., phenyl, biphenyl, etc., radicals; alkaryl radicals, e.g., tolyl, ethylphenyl, etc., radicals; aralkyl radicals, e.g., benzyl, phenylethyl, etc., radicals. The substituent on the aryl radical accordingly can be any one which does not constitute or contain an atom or radical reactive with the alkali-metal salt of either Formula II or III.

Since the radical R" may eventually be removed through hydrolysis techniques in order to obtain a carboxy group, R" is a monovalent hydrocarbon radical of from 1 to 12 carbon atoms which is not critical in the process herein described. Thus, R" may be an alkyl radical, for instance, methyl, ethyl, propyl, isobutyl, hexyl, 2-ethyl hexyl, etc.; an aryl radical, for instance, phenyl, biphenyl, etc.; an aralkyl radical, for instance, benzyl, phenylethyl; an alkaryl radical, for instance, tolyl, ethylphenyl, etc. Preferably R" is an alkyl radical of from 2 to 4 carbon atoms.

Although T and A in Formulas IV and V can be ortho, meta and para to each other, preferably they are meta or para to their positions on the arylene-nuclei.

The means whereby the process of the present invention may be practiced and compositions herein defined obtained can be varied widely and to a considerable extent depend on whether a monoalkali metal salt of the general Formula II or a dialkali metal salt of the general Formula III are employed. When a monoalkali metal salt of Formula II is used, generally 1 mol of the latter per mol of the benzenoid compound of Formula I is advantageously used. Obviously the molar ratio of these two ingredients may be varied widely and broadly from 1 to up to 3 or more mols of the monoalkali metal salt of Formula II per mol of the benzenoid compound of Formula I can be employed. Generally no advantage is obtained in using an excess of the monoalkali metal salt with the exception that the reaction may be promoted in the direction of higher yields and greater completion.

On the other hand when dialkali metal salts of Formula III are used with the benzenoid compound of Formula I, the molar ratio is advantageously at least 2 mols of the benzenoid compound of general Formula I per mol of the dialkali metal salt of Formula III. Excess molar quantities of the benzenoid compound over the molar quantity of the dialkali metal salt of Formula III may be employed without departing from the scope of the invention; thus from 2 to 4 or more mols of the benzenoid compound of Formula I may be used per mol of the dialkali metal salt of Formula III.

In making the alkali-metal salts of Formulas II and III, it is advantageous to preform these salts by reacting the corresponding monohydroxy organic compound or dihydroxy organic compound with an alkali-metal hydroxide such as sodium hydroxide, potassium hydroxide, etc. For instance, sodium phenate may be obtained by reacting in a manner well known in the art, 1 mol sodium hydroxide per mol of phenol. By the same token, the dialkali salt of bisphenol-A may be obtained, for instance, by reacting 2 mols of sodium hydroxide per mol of bisphenol-A. Persons skilled in the art will have no difficulty in determining how to make the alkali-metal salts of Formulas II and III for use with the benzenoid compound of Formula I.

Alternatively, the phenol (which includes thiophenols) or bisphenol (which includes bisthiophenols) may be converted to its salt during reaction with benzenoid compounds of Formula I by addition of an alkali metal carbonate in adequate molar concentrations to a reaction mixture composed of the benzenoid compound of Formula I and the precursor hydroxy or thio aromatic compound required to form the alkali-metal salt of Formulas II or III.

The conditions of reaction whereby the alkali-metal salts of Formulas II and III are reacted with the benzenoid compound of Formula I can be varied widely. Generally, temperatures of the order of about 50–150° C. are advantageously employed, although it is possible to employ lower or higher temperature conditions depending on the ingredients used, the reaction product sought, time of reaction, solvent employed, etc. In addition to atmospheric pressure, superpressures and subatmospheric pressures may be employed depending upon the other conditions of reaction, the ingredients used, the speed at which it is desired to effect reaction, etc.

The time of reaction also can be varied widely depending on the ingredients used, the temperature, the desired yield, etc. It has been found that times varying from about 30 minutes to as much as 30 to 40 hours are advantageously employed to obtain the maximum yield. Thereafter the reaction product can be treated in the manner required to effect precipitation and/or separation of the desired reaction product. Generally, common solvents such as diethyl ether, water, etc., are employed for the purpose. For purification purposes, the final product can be redistilled or recrystallized in manners well known in the art.

It is important that the reaction between the benzenoid compound of Formula I and the alkali-metal salts of Formula II or III be carried out in the presence of a dipolar aprotic solvent. The term "dipolar aprotic solvent" is intended to mean any organic solvent which has no active protons which may interfere with the reaction herein described. As will be evident to those skilled in the art, any dipolar aprotic solvent which is capable of dissolving the reactants and causing intimate contact of the reaction ingredients may be used.

Among the preferred aprotic solvents which may be employed in the practice of this invention are non-acid, oxygen-containing, nitrogen-containing organic solvents. These include but are not limited to, for instance, acetonitrile, dimethylether of diethylene glycol, N,N-dimethylacetamide, N - methylpyrrolidone, N,N - dimethylformamide, dimethylsulfoxide, etc.

The amount of solvent used in the reaction mixture may be varied widely. Generally, on a weight basis, one can employ from 0.5 to 50 or more parts of the solvent per part of total weight of the reactants, namely, the benzenoid compound of Formula I and the alkali-metal compound of Formula II or III. The amount of solvent is not critical, but generally we have found that on a weight basis one can employ from 2 to 20 parts of the solvent per part of the total weight of the benzenoid compound and the alkali metal compound.

In order that those skilled in the art may better understand how the present invention may be practiced, the following examples are given by way of illustration and not by way of limitation. All parts are by weight unless otherwise indicated.

EXAMPLE 1

A mixture of 2.2517 grams (0.0205 mol) hydroquinone, 1.6378 grams (0.041 mol) sodium hydroxide, 40 ml. dimethyl sulfoxide (DMSO) and 15 ml. toluene were heated under reflux in a nitrogen atmosphere for about 3 hours. A Dean-Stark trap was used to remove the water formed during the reaction. Thereafter, 6.888 grams (0.041 mol) ethyl p-fluorobenzoate was added and the mixture was stirred under nitrogen for 1 hour at 110° C. and for 16 hours at 130° C. The DMSO solution was poured into 500 ml. water and the formed precipitate was filtered and recrystallized from 200 ml. absolute ethanol to give about 7.45 grams of crystalline needles. Concentration of the mother liquor gave an additional 0.6 gram with an overall yield of 1,4-bis(p-carboethoxyphenoxy)benzene of 96.8%. Distillation of the product at 212–220° C. (0.15 mm. pressure) and recrystallization from absolute ethanol gave white needles, melting at 124–125° C. Nuclear magnetic resonance (NMR) examination of this product and the following elemental analyses established the identity of the above-mentioned compound:

Calculated (percent): C, 71.0; H, 5.41. Found (percent): C, 71.3; H, 5.61.

EXAMPLE 2

A mixture of 1.159 grams (0.0051 mol) 2,2-bis(4-hydroxyphenyl)propane (hereinafter identified as BPA), 0.4061 gram (0.01015 mol) sodium hydroxide, 30 ml. DMSO and 10 ml. toluene was heated under reflux in a nitrogen atmosphere for 16 hours while at the same time removing moisture by means of a Dean-Stark trap. Thereafter, to the above solution was added 2.0085 grams (0.0103 mol) ethyl-p-nitrobenzoate and the mixture was stirred under nitrogen at 110° C. for 23 hours. The reaction mixture was poured into 300 ml. of water and the product extracted with diethyl ether. The ether extract was washed with water, dried with sodium sulfate, decolorized with carbon (Norite), filtered, and the ether distilled to leave a viscous semi-crystalline oil. Distillation of this product at 250–310° C. (0.2 mm. pressure)

gave 1.7 grams (about 64% yield) of bis-(p-carboethoxyphenyl)ether of the BPA, the formula for which is (VII)
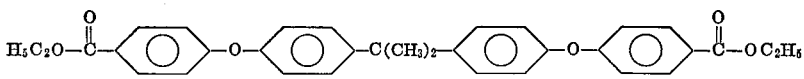

Recrystallization from absolute ethanol gave white needles melting at 106–107° C. This material was identified as being the desired compound by infrared examination and by elemental analyses which were as follows:

Calculated (percent): C, 75.6; H, 6.11. Found (percent): C, 76.0; H, 5.93.

Treatment of the above-described diester with aqueous sodium hydroxide converted the former to the corresponding diacid. Further reaction with thionyl chloride gave the diacyl halide having the formula (VIII)
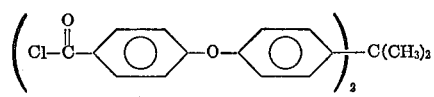

which hereinafter will for brevity be identified as "BPDAC." The identity of the diacyl halide was established by the following elemental analysis:

Calculated (percent): C, 68.9; H, 4.36; Cl, 14.0. Found (percent): C, 69.2; H, 4.40; Cl, 14.1.

EXAMPLE 3

A mixture of 0.907 gram (0.0082 mol) of hydroquinone, 2.0 grams (0.0165 mol) of p-fluorobenzonitrile, 2.24 grams (0.0165 mol) of potassium carbonate, and 20 ml. of dry dimethyl formamide (DMF) was stirred under nitrogen at 120° C. for 23 hours. The DMF solution was poured into 350 ml. water and the precipitate filtered, dried in vacuum, and distilled at about 220° C. (0.15 mm. pressure) to give 2.40 grams (93.4% yield) of 1,4-bis(p- cyanophenoxy)benzene. Recrystallization from acetone gave white needles having a melting point of 212–213.5° C. In addition to identification of the product by infrared, elemental analysis also established the identity as evidenced by the following:

Calculated (percent): C, 76.9; H, 3.87; N, 8.94. Found (percent): C, 77.2; H, 3.91; N, 8.94.

EXAMPLE 4

A mixture of 9.50 grams (0.022 mol) of the bis(p-cyanophenyl)ether of BPA having the formula (IX)
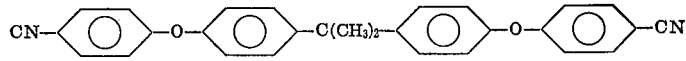

(prepared by reacting p-fluorobenzonitrile with BPA in the same fashion as Example 3), 20 grams potassium hydroxide, 100 ml. methanol and 50 ml. water was heated under reflux in a nitrogen atmosphere for 48 hours. The mixture was cooled, 100 ml. water and sufficient 10% aqueous hydrochloric acid were added until the pH of the solution became less than 3. The white precipitate which formed was filtered and dried in vacuum to give 10.3 grams (100% yield) of the bis(p-carboxyphenyl) ether of BPA having the formula (X)
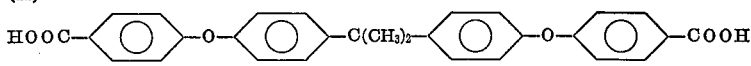

This white, powdery product melted at 270–275° C. and was identified by infrared and by NMR as being the desired compound.

EXAMPLE 5

A mixture of 1.41 grams (0.015 mol) phenol and 20 ml. of dry DMF was stirred under nitrogen at room temperature while 0.6 gram (0.0125 mol) of 50% sodium hydride dispersion in mineral oil was added. After stirring for 30 minutes at room temperature, 2.43 grams (0.01 mol) phenyl-o-nitrobenzoate was added and the mixture was stirred at 95° C. for 18 hours. The DMF solution was poured into 600 ml. water and the product extracted with diethyl ether which was then washed with water, 5% aqueous sodium hydroxide, water, decolorized and dried with sodium sulfate. The solution was filtered and the diethyl ether from the solution was distilled to give a white solid which when distilled at 150–165° C. (0.5 mm. pressure) gave a 41.5% yield of phenyl-o-phenoxybenzoate. This material was recrystallized from absolute ethanol to give fine white needles having a melting point 109–110° C. This compound which had the formula

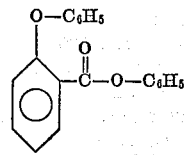

was identified by infrared as being the desired composition and by elemental analyses which were as follows:

Calculated (percent): C, 78.60; H, 4.83. Found (percent): C, 78.50; H, 4.90.

EXAMPLE 6

A mixture of 2.76 grams (0.02 mol) m-hydroxy-benzoic acid, 1.5862 grams (0.03965 mol) sodium hydroxide, 20 ml. DMSO, and 10 ml. toluene was heated under reflux in a nitrogen atmosphere for 7 hours using a Dean-Stark trap to remove water. To the DMSO solution was added 3.86 grams (0.02 mol) ethyl p-fluorobenzoate and the mixture was stirred at 125° C. for 4 hours and then poured into 200 ml. water. The aqueous solution was extracted with 200 ml. diethyl ether, and then acidified with 5% aqueous HCl. The precipitate which was obtained was filtered, washed with water and then dissolved in 50 ml. of hot absolute ethanol from which, on cooling about 4.8 grams (83.2% yield) of silvery needles were obtained. The distillation of the product at 175° C. (0.2 mm. pressure and recrystallization from absolute ethanol gave a white crystalline solid melting at 131.5–133° C. This material was identified by NMR and by the following elemental analyses as being the desired 4-carboethoxy-3′-carboxy-diphenylether:

Calculated (percent): C, 67.15; H, 4.90. Found (percent): C, 66.9; H, 4.85.

This compound had the formula (XII)

EXAMPLE 7

To a solution of 1.6 grams (0.02 mol) of 50% aqueous sodium hydroxide in 20 ml. DMSO was added 1.86 grams (0.02 mol) 4,4′-biphenol. Enough toluene was added to remove the water formed by azeotropic distillation. When all the sodium hydroxide had reacted and essentially all the water had been removed, the excess toluene was removed by distillation and a solution of 3.9 grams (0.02 mol) ethyl p-nitrobenzoate in 10 ml. DMSO was added. The resulting solution was heated for 24 hours at 130° C. with stirring, cooled to room temperature and then poured into water to give a semisolid precipitate. Extraction with chloroform followed by drying the extract with sodium sulfate and evaporation to dryness gave a product which upon recrystallization from ethanol yielded pure bis-(p-carboethoxyphenoxy)biphenyl melting at 157–158° C. The identity of the product was established by NMR and also by elemental analyses which showed the following:

Calculated (percent): C, 74.8; H, 5.4. Found (percent): C, 74.8; H, 5.4.

This composition had the formula (XIII)
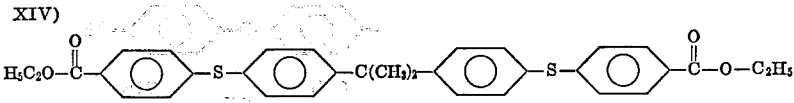

EXAMPLE 8

A mixture of 0.2860 gram (0.0011 mol) of bisphenol-A dithiol having the formula

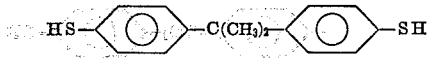

0.0881 gram (0.0022 mol) sodium hydroxide, 10 ml. DMSO and 15 ml. benzene was stirred at reflux temperature under nitrogen over a Dean-Stark trap for 5 hours. The mixture was cooled to room temperature, and thereafter 0.3696 gram (0.0022 mol) ethyl-p-fluorobenzoate was added and the solution was stirred at 90° C. for 30 hours. The cooled solution was poured into 250 ml. water and the products were extracted from the aqueous medium with diethyl ether. The ether extract was dried with sodium sulfate, filtered and the ether was distilled. The crude residue was then again distilled and the fraction boiling from 280–320° C. (0.1 mm. pressure) was collected in the form of a colorless oil which solidified on cooling. The distilled product was then recrystallized twice from absolute ethanol and dried in vacuum to give white needles melting at 77–78° C. This product which was the bis(p-carboethoxyphenyl) dithio ether of BPA having the formula XIV)

was then identified as this product by infrared, NMR, and by elemental analyses with the following results:

Calculated (percent): C, 71.2; H, 5.75; S, 11.50. Found (percent): C, 71.2; H, 5.79; S, 11.3.

Hydrolysis of the above-mentioned diester of Formula XIV yielded the corresponding dicarboxylic acid derivative.

EXAMPLE 9

A sodium salt was prepared by dissolving 4.56 grams (0.002 mol) of BPA in 20 ml. of DMSO containing 0.80 gram (0.01 mol) of 50% aqueous sodium hydroxide. The mixture was warmed to 60° C. to obtain a homogeneous solution and about 40 ml. toluene was added. The mixture was heated in order to remove the water by azeotropic distillation. When essentially all the water was removed, excess toluene was also distilled away and a solution of 1.85 grams (0.01 mol) ethyl-p-nitrobenzoate in 10 ml. DMSO was added. The resulting solution was heated for about 18 hours at 100° C. in an inert atmosphere and thereafter poured into water. The upper layer was extracted with diethyl ether, dried with sodium sulfate and the ether solvent removed to yield an oily residue. Upon distillation of this residue in vacuum, there was obtained the mono-p-carbethoxyphenyl ether and the di-p-carbethoxyphenyl ether of BPA having the respective formulas XV
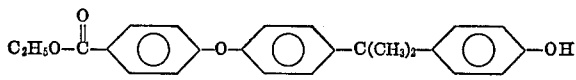

XVI
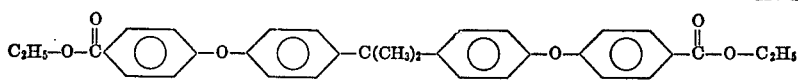

The identity of these two ethers was established by chromatography and NMR. Further identification of the mono-ether was proved by the following elemental analyses:

Calculated (percent): C, 76.6; H, 6.43. Found (percent): C, 76.3; H, 6.35.

Treatment of the above two ester derivatives with aqueous sodium hydroxide will convert them to the corresponding monocarboxylic and dicarboxylic acid derivatives. Treatment with thionyl chloride will convert the carboxylic acid derivative to the corresponding monoacyl or diacyl halide.

EXAMPLE 10

Sodium phenoxide was prepared by adding 0.94 gram (0.01 mol) phenol to a solution of 0.8 gram (0.01 mol) of 50% aqueous sodium hydroxide in 15 ml. DMSO. 15 ml. benzene was then added and water was removed by azeotropic distillation. When essentially all the water was removed, excess benzene was then distilled and to the remaining DMSO solution was added 1.48 grams (0.01 mol) o-nitrobenzonitrile. The resulting solution was heated for one hour at 60–70° C. in an inert atmosphere and then poured into water. The upper layer was extracted with diethyl ether, washed with water, dried over sodium sulfate and the diethyl ether solvent removed. Distillation of the residue gave 1.9 grams (98% yield) of o-phenoxybenzonitrile whose identity was established by infrared and by mass spectroscopic examination.

EXAMPLE 11

A solution of sodium phenoxide in anhydrous N,N-dimethylformamide was prepared by adding 0.6 gram (0.0125 mol) 50% sodium hydride dispersion in mineral oil to a solution of 1.41 grams (0.015 mol) phenol in 25 ml. DMF. After stirring for about 30 minutes in an inert atmosphere, 2.16 grams (0.01 mol) phenyl-p-fluorobenzoate was added. The resulting solution was heated at 140° C. for 4 hours and then poured into water. The upper layer was extracted with diethyl ether and the extract was washed with water and dried over sodium sulfate. Thereafter, the diethyl ether was removed to give essentially pure phenyl-p-phenoxybenzoate in a yield in excess of 75%.

EXAMPLE 12

A solution of sodium phenoxide in anhydrous DMF was prepared by the addition of 0.6 gram (0.0125 mol) of 50% sodium hydride dispersion in mineral oil to a solution of 1.41 grams (0.015 mol) of phenol in 25 ml. DMF maintained in a nitrogen atmosphere. After stirring for about 30 minutes in this inert atmosphere, 2.43 grams (0.01 mol) phenyl-p-nitrobenzoate was added. The resulting solution was stirred for 2 hours at 100° C., poured into water, the upper layer separated and extracted with benzene. The extract was washed with water, dried over sodium sulfate, and thereafter the benzene solvent was removed to yield an oily product which upon crystallization gave 2.35 grams (81% yield) of phenyl-p-phenoxybenzoate. Further recrystallization from pentane gave the desired product as white needles, melting point 94–95° C. The identity of this product was further established by the following elemental analyses:

Calculated (percent): C, 7.86; H, 4.83. Found (percent): C, 7.85; H, 4.89.

EXAMPLE 13

Employing the same conditions as are recited in Examples 2, 4, 7 and 8, other compositions can be prepared coming within the scope of Formula IV, substituting other reactants of Formula I in place of the corresponding reactant in these examples, and other reactants of Formula III in place of the corresponding alkali-metal salts used in these earlier examples. The following Table I recites some of the reactants which can be employed to form the products coming within the scope of Formula IV. The heading "Reactant A" corresponds to the benzenoid compound of Formula I which can be used, and the heading "Reactant B" corresponds to the precursor dihydroxy compound of Formula II. The products derived from the reaction of Reactants A and Reactants B are found under the heading "Product" in said Table I. In the table, the designation "Et" is intended to mean the $C_2H_5$— radical.

TABLE I

| Sample No. | Reactant A | Reactant B |
|---|---|---|
| 1 | NC—⟨O⟩—F | HO—⟨O⟩(CH₃)(CH₃)—⟨O⟩(CH₃)(CH₃)—OH |
| 2 | EtO₂C—⟨O⟩—F | HO—⟨O⟩—SO₂—⟨O⟩—OH |
| 3 | ⟨O⟩(CN)—F | HO—⟨O⟩—C(=O)—⟨O⟩—OH |
| 4 | ⟨O⟩(CO₂Et)—F | HO—⟨O⟩—⟨O⟩—OH |
| 5 | Same as Sample No. 1 | HS—⟨O⟩(CH₃)(CH₃)—⟨O⟩—SH |
| 6 | EtO₂C—⟨O⟩—NO₂ | HO—⟨O⟩—CH₂—⟨O⟩—OH |
| 7 | ⟨O⟩(CO₂Et)—NO₂ | HO—⟨O⟩(CH₃)(CH₃)—⟨O⟩—OH |
| 8 | Same as Sample No. 6 | HO—⟨O⟩—O—⟨O⟩—OH |
| 9 | NC—⟨O⟩—NO₂ | HO—⟨O⟩(CH₃)(CH₃)(CH₃)(CH₃)—⟨O⟩(CH₃)(CH₃)(CH₃)—OH |
| 10 | Same as Sample No. 3 | HO—⟨O⟩(CH₃)(CH₃)—⟨O⟩(CH₃)(CH₃)—OH |
| 11 | Same as Sample No. 2 | HO—⟨O⟩—NH₂ |
| 12 | ...do... | HO—⟨O⟩(CH₃) |
| 13 | Same as Sample No. 1 | HS—⟨O⟩ |

TABLE—Continued

| Sample No. | Reactant A | Reactant B |
|---|---|---|
| 14 | Same as Sample No. 1 | HO–⟨C₆H₂(CH₃)₂⟩ (2,6-dimethylphenol) |
| 15 | Same as Sample No. 3 | HO–⟨C₆H₄⟩–φ |
| 16 | Same as Sample No. 6 | HO–⟨C₆H₄⟩–CO₂H |
| 17 | do | HO–⟨C₆H₄⟩–NO₂ |
| 18 | do | HO–⟨C₆H₃(CH₃)⟩ (cresol) |
| 19 | Same as Sample No. 4 | HO–⟨C₆H₄⟩–Cl |
| 20 | Same as Sample No. 9 | HO–⟨C₆H₄(φ)⟩ (2-phenylphenol) |

| Sample No. | Product |
|---|---|
| 1 | NC–⟨C₆H₄⟩–O–⟨C₆H₂(CH₃)₂⟩–⟨C₆H₂(CH₃)₂⟩–O–⟨C₆H₄⟩–CN |
| 2 | EtO₂C–⟨C₆H₄⟩–O–⟨C₆H₄⟩–SO₂–⟨C₆H₄⟩–O–⟨C₆H₄⟩–CO₂Et |
| 3 | ⟨C₆H₄(CN)⟩–O–⟨C₆H₄⟩–C(O)–⟨C₆H₄⟩–O–⟨C₆H₄(CN)⟩ |
| 4 | ⟨C₆H₄(CO₂Et)⟩–O–⟨C₆H₄⟩–⟨C₆H₄⟩–O–⟨C₆H₄(CO₂Et)⟩ |
| 5 | NC–⟨C₆H₄⟩–S–⟨C₆H₄⟩–C(CH₃)₂–⟨C₆H₄⟩–S–⟨C₆H₄⟩–CN |
| 6 | EtO₂C–⟨C₆H₄⟩–O–⟨C₆H₄⟩–CH₂–⟨C₆H₄⟩–O–⟨C₆H₄⟩–CO₂Et |
| 7 | ⟨C₆H₄(CO₂Et)⟩–O–⟨C₆H₄⟩–C(CH₃)₂–⟨C₆H₄⟩–O–⟨C₆H₄(CO₂Et)⟩ |
| 8 | EtO₂C–⟨C₆H₄⟩–O–⟨C₆H₄⟩–O–⟨C₆H₄⟩–O–⟨C₆H₄⟩–CO₂Et |
| 9 | NC–⟨C₆H₄⟩–O–⟨C₆H₂(CH₃)₂⟩–C(CH₃)₂–⟨C₆H₂(CH₃)₂⟩–O–⟨C₆H₄⟩–CN |
| 10 | ⟨C₆H₄(CN)⟩–O–⟨C₆H₃(CH₃)⟩–C(CH₃)₂–⟨C₆H₃(CH₃)⟩–O–⟨C₆H₄(CN)⟩ |

TABLE—Continued

| Sample No. | Product |
|---|---|
| 11 | EtO₂C—⟨⟩—O—⟨⟩—NH₂ |
| 12 | EtO₂C—⟨⟩—O—⟨⟩(CH₃) |
| 13 | NC—⟨⟩—S—⟨⟩ |
| 14 | NC—⟨⟩—O—⟨⟩(CH₃)(CH₃) |
| 15 | ⟨⟩(CN)—O—⟨⟩—φ |
| 16 | EtO₂C—⟨⟩—O—⟨⟩—CO₂H |
| 17 | EtO₂C—⟨⟩—O—⟨⟩—NO₂ |
| 18 | EtO₂C—⟨⟩—O—⟨⟩(CH₃) |
| 19 | ⟨⟩(CO₂Et)—O—⟨⟩—Cl |
| 20 | NO—⟨⟩—O—⟨⟩(φ) |

EXAMPLE 14

Employing the same conditions as recited in Example 9, other compositions can be prepared coming within the scope of Formula V, substituting other reactants of Formula I in place of the corresponding reactant in Example 9, and other reactants of Formula III in place of the corresponding alkali-metal salt used in the earlier Example 9. The following Table II recites the reactants which can be employed to form the products coming within the scope of Formula V. The definitions of "Reactant A," "Reactant B," "Product," and the designation "Et," are the same as those recited for the equivalent terms in Example 13.

TABLE II

| Sample No. | Reactant A | Reactant B | Product |
|---|---|---|---|
| 21 | Same as Sample No. 1 | HO—⟨⟩(CH₃O)(CH₃O)—⟨⟩(OCH₃)(OCH₃)—OH | NC—⟨⟩—O—⟨⟩(CH₃O)(CH₃O)—⟨⟩(OCH₃)(OCH₃)—O—H |
| 22 | Same as Sample No. 2 | HO—⟨⟩—C(CH₃)(H)—⟨⟩—OH | EtO₂C—⟨⟩—O—⟨⟩—C(CH₃)(H)—⟨⟩—OH |
| 23 | Same as sample No. 4 | Same as sample No. 2 | ⟨⟩(CO₂Et)—O—⟨⟩—SO₂—⟨⟩—OH |
| 24 | Same as sample No. 3 | Same as sample No. 3 | ⟨⟩(CN)—O—⟨⟩—C(=O)—⟨⟩—OH |
| 25 | Same as sample No. 2 | HO—⟨⟩—S—⟨⟩—OH | EtO₂C—⟨⟩—O—⟨⟩—S—⟨⟩—OH |
| 26 | Same as sample No. 6 | HO—⟨⟩—C(φ)(H)—⟨⟩—OH | EtO₂C—⟨⟩—O—⟨⟩—C(φ)(H)—⟨⟩—OH |

TABLE II—Continued

| Sample No. | Reactant A | Reactant B | Product |
|---|---|---|---|
| 27 | Same as sample No. 9 |  |  |
| 28 | Same as sample No. 6 | Same as sample No. 4 |  |
| 29 | Same as sample No. 7 | Same as sample No. 7 | 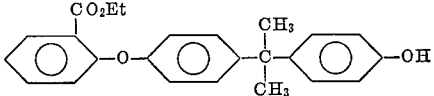 |
| 30 | Same as sample No. 3 | Same as sample No. 25 | 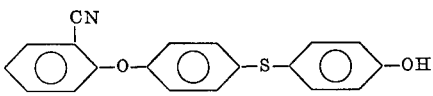 |

EXAMPLE 15

Employing the same conditions as are recited in Examples 1 and 3, other compositions can be prepared coming within the scope of Formula VI, substituting other reactants of Formula I in place of the corresponding reactants of Examples 1 and 3, and other reactants of Formula III in place of the corresponding alkali-metal salts used in the earlier examples. Table III gives the reactants which can be employed to form the products coming within the scope of Formula VI. Again the headings "Reactant A," "Reactant B," "Product," and the designation "Et," are the same as those recited for Example 13.

TABLE III

| Sample No. | Reactant A | Reactant B | Product |
|---|---|---|---|
| 31 | Same as sample No. 2 |  |  |
| 32 | Same as sample No. 1 | Same as sample No. 31 | 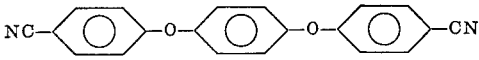 |
| 33 | Same as sample No. 2 |  | 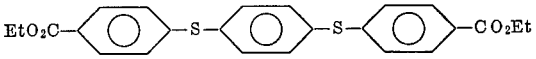 |
| 34 | do |  |  |
| 35 | Same as sample No. 3 | Same as sample No. 33 |  |
| 36 | Same as sample No. 6 |  |  |
| 37 | Same as sample No. 9 |  |  |
| 38 | Same as sample No. 6 |  |  |
| 39 | Same as sample No. 7 | Same as sample No. 36 |  |
| 40 | Same as sample No. 6 | 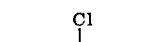 |  |

EXAMPLE 16

A mixture of 1.86 grams (0.015 mol) p-methoxyphenol, 1.20 grams (0.015 mol) 50% aqueous sodium hydroxide, 30 ml. DMSO and 15 ml. benzene was stirred at the reflux temperature of the mass under nitrogen over a Dean-Stark trap for 4 hours. After about 10 ml. benzene was removed by distillation and the reaction mixture was cooled to 100° C., a solution of 2.52 grams (0.015 mol) ethyl p-fluorobenzoate in 5 ml. DMSO was added and the mixture was again stirred for 2 hours at 110° C. After this the mixture was cooled to room temperature and poured into 200 ml. water. The crude product was extracted from the aqueous solution with diethyl ether and the ether extract washed with water, dried with sodium sulfate, filtered, and the ether was distilled to leave an oil which after redistillation gave 3.90 grams (about 95.5% yield) of ethyl-4-(p-methoxyphenoxy)-benzoate.

EXAMPLE 17

When Example 16 was repeated but instead m-methoxyphenol was substituted for the p-methoxyphenol of Example 16, there was obtained, in about a 92% yield, ethyl-4-(m-methoxyphenoxy)benzoate. By treating this latter compound with potassium hydroxide and water and the small amount of ethanol and heating the mixture at reflux for about 15 hours and then diluting the mixture with water and acidification of the mixture to a pH of less than 3 by addition of 10% hydrochloric acid, there was obtained 4-(m-methoxyphenoxy)benzoic acid in the form of white needles melting at 121–122° C. Treatment of the 4-(m-methoxyphenoxy)benzoic acid with a small amount of 48% hydrobromic acid and small amount of glacial acetic acid and subsequent refluxing of the mixture under a nitrogen atmosphere for about 6 hours, and redistillation yielded 4-(m-hydroxyphenoxy)benzoic acid in the form of white prisms melting at 168–170° C.

EXAMPLE 18

A mixture of 1.38 grams (0.01 mol) p-hydroxybenzoic acid, 0.8 gram (0.01 mol) sodium hydroxide (in the form of 1.584 grams of a 50.5% aqueous sodium hydroxide solution), 15 ml. DMSO and 15 ml. benzene was stirred at reflux temperature under nitrogen over a Dean-Stark trap for 5 hours and the benzene was removed by distillation. The mixture was cooled and 2.39 grams (0.01 mol) p-nitrobenzonitrile was added. The solution was stirred under nitrogen at 80° C. for 24 hours, poured into 150 ml. water, filtered and the aqueous solution was acidified to a pH of less than 2 with 10% hydrochloric acid. The product which precipitated from the acidic solution was isolated by filtration, washed with water, and dissolved in 200 ml. of hot 30% ethanol. On cooling, the product crystallized from the ethanol solution as light golden needles in about a 90 %yield of 4-(p-cyanophenoxy)benzoic acid. Sublimation of these crystals at 170° C. and recrystallization again from absolute ethanol gave fine, white needles, melting at 203.5–204.5° C. The identity of the compound was established by infrared examination and by nuclear magnetic resonance.

EXAMPLE 19

A mixture of 1.09 grams (0.01 mol) p-aminophenol, 1.48 grams (0.01 mol) p-nitrobenzonitrile, 1.38 grams (0.01 mol) potassium carbonate, and 10 ml. of dry DMSO was stirred under nitrogen at 70° C. for 15 hours and was then poured into 150 ml. water. The solid which precipitated was extracted from the aqueous solution with diethyl ether and the ether extract was washed with water, dried with sodium sulfate, washed with decolorizing carbon, filtered and the ether was removed to leave a solid. This solid which melted upon heating was distilled at 150–160° C. (0.025 mm.) and then recrystallized from absolute ethanol to give golden, yellow needles, M.P. 108–110° C. That this was the desired 4-(p-amino-phenoxy)benzonitrile was established by infrared examination and by the following elemental analyses:

Calculated (percent): C, 74,3; H, 4.76; N, 13.32.
Found (percent): C, 73.8; H, 4.80; N, 13.2.

The following examples illustrate in greater detail the unsuccessful attempts to make aryloxy derivatives of aromatic compounds containing a carbonyl group attached directly to the aromatic compound where the carbonyl group is not part of an ester or nitrile group as is called for in the instant invention.

EXAMPLE A

A solution of sodium phenoxide and anhydrous DMF was prepared by the addition of 0.96 gram (0.02 mol) of a 50% sodium hydride dispersion in mineral oil to a solution of 1.88 grams (0.02 mol) phenol in 25 ml. anhydrous DMF. After stirring for about 30 minutes in an inert atmosphere, 1.67 grams (0.01 mol) p-nitrobenzoic acid was added and the resulting solution was heated at 100° C. for 24 hours. A portion of the reaction product was withdrawn, neutralized with dilute HCl and the precipitate which formed was caused to react with bistrimethylsilylacetamide. Gas liquid chromatography of the reaction mixture showed only the trimethylsilyl ester of p-nitrobenzoic acid and not even trace amounts of the trimethylsilyl ester of p-phenoxybenzoic acid were obtained. Continued heating for an additional 24 hours at 100° C. also failed to show any displacement by phenoxide radical.

EXAMPLE B

A solution of sodium phenoxide in anhydrous DMF was prepared by the addition of 0.48 gram 50% sodium hydride dispersion in mineral oil to a solution of 0.94 gram (0.01 mol) phenol in 25 ml. anhydrous DMF. After stirring for about 30 minutes in an inert atmosphere, 1.65 grams (0.01 mol) p-nitroacetophenone was added. The resulting solution was heated at 100° C. for 6 hours and examined by gas-liquid chromatography for the presence of p-phenoxyacetophenone. No even trace amounts of this compound could be detected.

EXAMPLE C

This example illustrates the poor result obtained by effecting reaction between phenyl p-chlorobenzoate (instead of phenyl p-fluorobenzoate) with sodium phenoxide. More particularly, a solution of sodium phenoxide in anhydrous DMF was prepared similarly as in Example B. After stirring this solution for about 30 minutes in an inert atmosphere, 2.32 grams (0.01 mol) phenyl p-chlorobenzoate was added. The resulting solution was heated at 100° C. for 6 hours and then examined by gas-liquid chromatography for the presence of phenyl p-phenoxybenzoate. Only a trace amount (less than 1%) of this compound was observed as compared with the good yields experienced with Examples 11 and 12.

The compositions herein described and taught and produced in accordance with the invention embraced by the claims have many uses. One of the more important uses to which these compositions may be put are as intermediates in the preparation of other compositions of matter. In addition, many of the compositions herein described and taught, particularly those which are liquid at room temperature may have application per se as solvents in the preparation of other organic compositions. In addition, referring to the simple aryloxy esters embraced by the compositions obtained, for instance, in Examples 5, 11, 12, 16 and in Table II, Sample Nos. 11 to 20, the esters can be hydrolyzed to give the corresponding monocarboxy derivative or the single cyano group can be hydrolyzed to again give the corresponding carboxy group and these carboxy substituted compounds can be reacted with long chain monohydric alcohols, for instance, 2-ethylhexanol to give ester compositions which are useful as plasticizers for vinyl halide resins, for instance, polyvinyl chloride resins.

More particularly, taking as a specific example, one can subject the compound phenyl-o-phenoxybenzoate (Example 5) to usual hydrolysis by treating with dilute aqueous HCl to give o-phenoxybenzoic acid. This acid can then be reacted in about equimolar quantities with 2-ethylhexanol to give the corresponding ester having the formula (XVII)

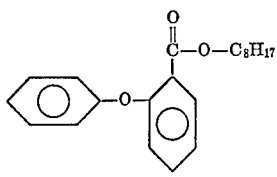

which can be used for plasticizing vinyl halide resins, etc. Again, o-phenoxybenzonitrile (Example 10) can be hydrolyzed to give the same o-phenoxy benzoic acid which in turn can be further esterified with a long chain monohydric alcohol, such as the aforementioned 2-ethyl hexanol to give the same ester which can be employed for plasticizing various polymers, particularly polyvinyl chloride resins. Additionally, these compositions of matter can also be used as ultra-violet light stabilizers for polyolefins, cellulose esters and for polyvinyl chloride resins.

The difunctional compositions obtained in accordance with the practice of the present invention, i.e., those which have similar groups which are capable of further reaction, for instance, an ester group, carboxy group, a cyano group, a hydroxy group, etc., can be reacted in a manner designed to effect hydrolysis and esterification with the appropriate ingredients. As a specific instance, the bis-(p-carboethoxyphenoxy)biphenyl of Example 7 can be hydrolyzed in the usual fashion to remove the ethyl groups on either end and to obtain the corresponding dicarboxy compound of the formula (XVIII)

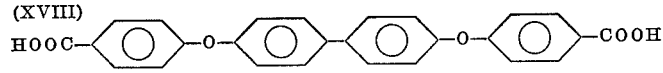

This composition can again be esterified with a long chain aliphatic alcohol such as 2-ethylhexanol to give a composition which has even a better and wider capability as a plasticizer for various resins including polyvinyl chloride, polystyrene, etc.

The compound 4-carboethoxy-3'-carboxydiphenylether (Example 6) can be treated to effect hydrolysis of the ester group and the corresponding dicarboxy diphenyl oxide can be reacted with long chain monohydric alcohols in a molar ratio of 2 mols of the monohydric alcohol per mol of the dicarboxy diphenyl ether. Such an ester can also be used for plasticizing polyvinyl chloride resins. If there is a cyano group instead of an ester group on an aryl nucleus, the cyano group can be hydrolyzed in a manner well known to those skilled in the art to give the corresponding carboxy group and then treated for esterification purposes in the manner described previously. The compositions of Formula V can be self-polymerized where Q is carboxy to give heat-resistant aromatic polyesters. The compositions capable of supplying two carboxy groups on different aryl nuclei have important uses in the preparation of polyamides. Thus, taking again the 4,4'-dicarboxydiphenyl oxide producible from Example 6, the latter composition can be reacted with hexamethylene diamine to form a polyamide commonly known as "nylon" which is an important polymeric composition useful in the textile and coating fields.

One of the more important uses to which the dicarboxy compositions can be employed is in the preparation of polyester polymeric compositions. The following examples illustrate the various polymeric compositions capable of preparation using the aforementioned dicarboxy compositions as starting material. All intrinsic viscosities were measured in methylene chloride.

EXAMPLE 20

A mixture of 5.0538 grams (0.01 mol) bis(p-chlorocarboxyphenyl)ether of bisphenol-A, 2.2829 grams (0.01 mol) bisphenol-A, and 35 ml. of a chlorinated hydrocarbon liquid (composed of chlorinated diphenyl and chlorinated diphenyl oxide) was stirred under nitrogen while the reaction temperature was raised gradually from room temperature to 320° C. over 1.5 hours. After cooling the clear viscous solution, the latter was diluted with 35 ml. methylene chloride and then added to pentane to precipitate the polymer. The crude polymer was dissolved in 100 ml. of methylene chloride, filtered, reprecipitated in pentane, and dried at 100° C. in vacuum to give a white fibrous polymer in about an 87% yield. Analyses of the polymeric composition showed the following results: Calculated (percent): C, 80.0; H, 5.43. Found (percent): C, 78.7; H, 5.45, indicating that the polymer was composed of recurring structural units of the formula (XIX)

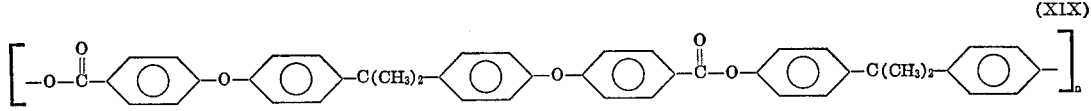

where $n$ is a whole number in excess of 1. This polymer which had an intrinsic viscosity $[\eta]^{25°\,C.}$ 0.51 could be dissolved in methylene chloride and extruded into the form of fine fibers which could be readily oriented. Furthermore, the polymer with or without fillers could be molded at elevated temperatures to give a homogeneous, well-knit product.

EXAMPLE 21

Employing the same conditions as in Example 20, a mixture of 5.0538 grams (0.01 mol) of bis(p-chlorocarboxyphenyl)ether of bisphenol-A, 1.1011 grams (0.01 mol) of hydroquinone, and 35 ml. of the chlorinated hydrocarbon liquid described in Example 20 was stirred under nitrogen while the reaction temperature was raised slowly from room temperature to 320° C. over a period of 1.5 hours. After cooling, the clear viscous solution was diluted with 35 ml. methylene chloride, and added to pentane to precipitate the product. The polymer was isolated by filtration and dried to yield an almost quantitative yield of a product which had an intrinsic viscosity $[\eta]^{25°\,C.}$ 0.47. Analyses showed the following results:

Calculated (percent): C, 77.6; H, 4.83. Found (percent): C, 76.9; H, 4.87.

This polymer could be extruded either from solution or from a hot melt to give fibers which could be readily oriented. The polymer could also be molded under heat and pressure to give useful molded products.

EXAMPLE 22

A mixture of 3.8721 grams (0.01 mol) of 1,4-bis(p-chlorocarboxyphenoxy)benzene, 1.9826 grams (0.01 mol) 4,4'-methylene dianiline, 3 ml. triethylamine, and 40 ml. N-methylpyrrolidone was stirred under nitrogen while the reaction temperature was raised from 30° C. to 130° C. over about a 15-minute period. After additional stirring at 130° C. for 30 minutes, a clear, colorless, viscous solution was obtained, which was cooled to about 120° C., whereupon the product began to precipitate from the solution. The N-methylpyrrolidone solution was poured into methanol and the polymer isolated by filtration, dried in vacuum at 100° C. for 24 hours to give a polymeric material in about a 95.6% yield. Analyses of the product indicated the following:

Calculated (percent): C, 77.5; H, 4.69; N, 5.47. Found (percent): C, 75.9; H, 5.48; N, 4.76.

This polyamide was composed of recurring structural units of the formula (XX)

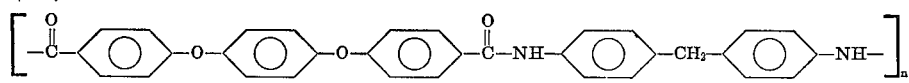

where $n$ is a whole number in excess of 1.

EXAMPLE 23

A mixture of 3.8721 grams (0.01 mol) of 1,4-bis(p-chlorocarboxyphenoxy)benzene, 1,1011 grams (0.01 mol) hydroquinone, and 35 ml. of the chlorinated hydrocarbon solvent mentioned in Examples 20 and 21 was stirred under nitrogen while the reaction temperature was raised gradually from room temperature to 330° C. over a period of 1.5 hours. The reaction mixture was clear, viscous, and homogeneous at 330° C., but when the temperature dropped below 320° C., the polymeric product precipitated. After cooling and diluting the mixture with 35 ml. methylene chloride, the formed slurry was added to acetone and a white powdery polymer was isolated by filtration and dried in vacuum at 180° C. for 120 hours to yield a polymer in almost a quantitative yield. Analyses of the polymer showed the following results:

Calculated (percent): C, 73.7; H, 3.80. Found (percent): C, 73.1; H, 3.87.

This polymer was composed of recurring structural units of the formula (XXI)

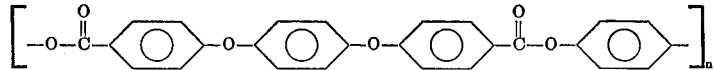

where $n$ is a whole number in excess of 1. This polymer had many uses for textile or coating purposes.

In addition to the utilities described previously for polymeric compositions derived from the difunctional aryloxy compounds described and taught in the instant application, these polymeric compositions can also have other utilities. These polymeric compositions may be used to form fibers, films, or molded products. Thus, either by extrusion from melt or by depositing from solution, fibers derived from these polymeric compositions may be formed and used in the preparation of various textile materials designed for clothing and similar applications. In addition, solutions of the polymers can be used to coat electrical conductors for insulation purposes. If desired, such solutions can be used as outside coating means for conductors already insulated with, for instance, heat resistant insulation such as polyimide resins; such outer coatings improve the abrasion resistance of the insulated conductor.

Various fillers may be incorporated in the polymeric compositions prior to molding thereof. Among such fillers may be mentioned glass fibers, carbon black, titanium dioxide, silica, mica, bentonite, etc. Molded products derived from such a mixture of ingredients can be used as gears, handles for cooking utensils, etc. The incorporation of abrasive particles such as carborundum, diamond powder, etc., makes such molded products derived from such polymeric compositions useful as grinding wheels, etc. The addition of carbon, silicon carbide, powdered metal, conducting oxides, etc. to the polymeric compositions results in the so-called resistance or semiconducting paints which have many useful applications.

The polymeric compositions herein described may also be incorporated into other materials to modify the properties of the latter. For example, they may be compounded with substances such as natural or synthetic rubbers, natural resins such as rosin, copal, shellac, etc.; synthetic resins such as phenol-aldehyde resins, alkyd resins, vinyl resins, esters of acrylic and methacrylic acid, etc.; cellulosic materials such as paper, inorganic and organic esters of cellulose such as cellulose nitrate, cellulose acetate, cellulose ethers, such as methyl cellulose, ethyl cellulose, etc.

Laminated products may be made by superimposing organic or inorganic fiber sheet materials coated and impregnated with the polymeric compositions and thereafter bonding the sheets under heat and pressure. Shaped articles formed from such compositions under heat and pressure in accordance with the practices now widely used in the plastics art have a number of well-known applications such as in the decorative field, electrical board field, etc.

It will of course be apparent to those skilled in the art that other conditions of reaction in addition to those specifically described in the foregoing examples may be employed without departing from the scope of the invention. Thus, it is apparent that many of the conditions outlined previously can be used for making the compositions herein described and claimed. Also, it will be apparent that the ingredients chosen for making the desired reaction products can be varied widely, many examples of which have been given above.

What we claim as new and desire to secure by Letters Patent of the United States Patent Office is:

1. A composition of matter selected from the class consisting of (a) compounds of the general formula

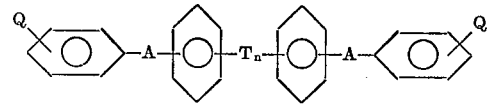

(b) compounds of the general formula

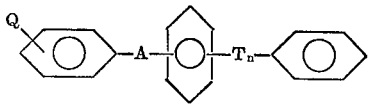

and (c) compounds of the general formula

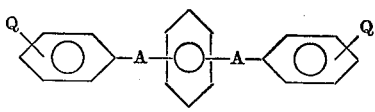

where Q is the —CN radical, A is oxygen or sulphur, T is a divalent bridging member selected from the group consisting of

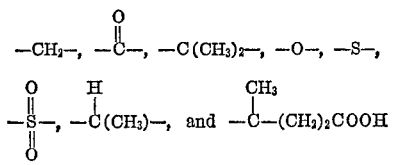

$n$ is 0 or 1, Q is ortho or para to A, and the A-s in (c) attached to the same phenylene radical are meta or para to each other.

2. A composition of matter as in claim 1 corresponding

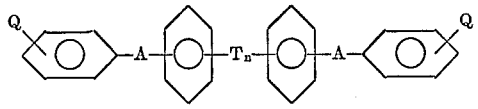

to the formula where Q, A, T and $n$ have the meanings given in claim 1.

3. A composition of matter as in claim 1 having the formula

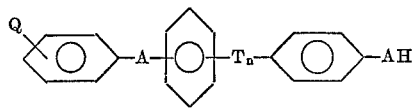

where Q, A, T and $n$ have the meanings given in claim 1.

4. A composition of matter as in claim 1 having the general formula

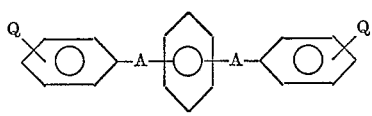

where Q and A have the meanings given in claim 1.

5. A composition having the formula

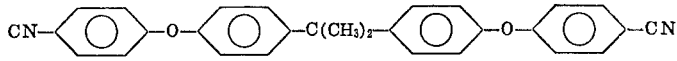

6. A composition having the formula

References Cited
UNITED STATES PATENTS 3,489,815   1/1970   Kraus, Jr. _____ 260—465 X
3,148,215   9/1964   Holsten et al. _____ 260—465 X LEWIS GOTTS, Primary Examiner D. H. TORRENCE, Assistant Examiner U.S. Cl. X.R.

260—75 R, 78 R, 92.8 R, 251 R, 283 CN, 287 R, 289 R, 294.9, 295, 465 D, 465 E, 465 G, 465 H, 470, 473 R, 516, 520, 544 M